R. A. TAWNEY.
CAM LEVER COUPLING.
APPLICATION FILED SEPT. 30, 1918.
1,310,456.
Patented July 22, 1919.
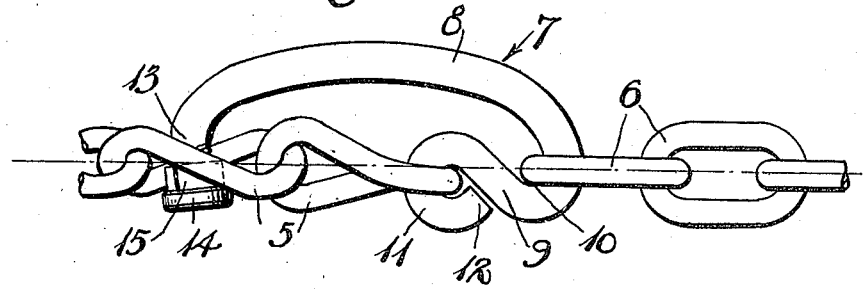
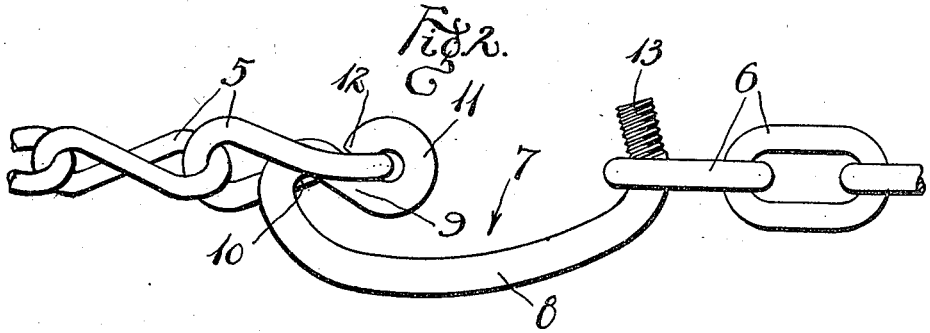
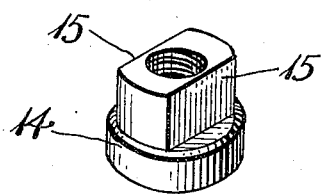
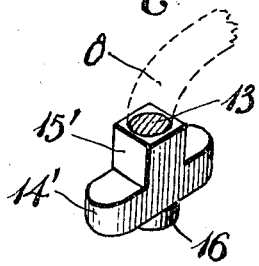
Rufus A. Tawney, Inventor,
by Monroe E. Miller,
Attorney.

UNITED STATES PATENT OFFICE.

RUFUS A. TAWNEY, OF GRAND JUNCTION, COLORADO.

CAM-LEVER COUPLING.

1,310,456.  Specification of Letters Patent.  Patented July 22, 1919.

Application filed September 30, 1918. Serial No. 256,205.

*To all whom it may concern:*

Be it known that I, RUFUS A. TAWNEY, a citizen of the United States, and resident of Grand Junction, in the county of Mesa and State of Colorado, have invented certain new and useful Improvements in Cam-Lever Couplings, of which the following is a specification.

This invention relates to couplings, and aims to provide a novel and improved cam lever coupling adapted especially for use on anti-skid chains such as are used on vehicle tires, although the coupling is employed for various purposes for connecting and drawing together two sets of links or other members.

It is the object of the invention to provide such a device which is very simple in construction, cheap to manufacture, convenient and efficient in use, and so constructed that accidental opening thereof is avoided.

With the foregoing and other objects in view, which will be apparent as the invention is more fully understood, the invention resides in the construction and combination of parts as hereinafter described and claimed, it being understood that changes can be made within the scope of what is claimed without departing from the spirit of the invention.

The invention is illustrated in the accompanying drawing, wherein—

Figure 1 is a side elevation of the coupling in closed position.

Fig. 2 is a similar view showing the coupling in open position with the locking member removed.

Fig. 3 is a perspective view of the locking member.

Fig. 4 is a similar view of a modified form of locking member.

As depicted in the drawing, the coupling is used for drawing together and connecting chain links 5 and 6, such as are used at the opposite sides of an anti-skid chain for a vehicle wheel tire, the coupling designated 7 being used in this event for tightening the chain on the tire, but the links 5 and 6 can be taken to represent various slotted members for which the coupling is suited.

In carrying out the invention, the cam lever coupling 7 is bent from a rod or other suitable stock, and has the bill 8 which is curved on a relatively large arc, with a radius approximately equal to the distance between the ends of the bill, so that the bill has a gentle curvature throughout the greater part of its length. At one end the bill 8 has an abrupt bend from which projects a reëntrant portion 9, forming a seat or loop 10 of substantial U-shape for one of the links 6 through which the bill 8 is inserted. The portion 9 being reëntrant extends between the ends of the bill, and said portion constitutes one terminal of the rod which is bent away from the bill 8 and back toward the seat 10 to form a pivot eye or portion 11 with the extremity 12 at that side of the portion 9 opposite to the bill 8, so as not to interfere with the link 6 which engages the bill. The end link 5 engages through the aperture of the eye or loop 11 to pivotally connect said link and coupling and permitting the latter to be swung back and forth.

The bill 8 is provided at its other or free end with a hook terminal 13, formed by an abrupt bend in the rod at that end of the bill. It will be noted that the bill extends increasing distances from the eye or portion 11 toward the free end of the bill and near its free end has an abrupt turn so that the terminal 13 extends reversely, that is, instead of continuing away from the eye 11, it does just the reverse and thereby forms a hook in which any one of the links 6 can be seated when the coupling is in open position, as shown in Fig. 2. In this way, the links 5 and 6 can be connected in a preliminary manner before the coupling is swung into closed position. This is particularly desirable when there are several of the couplings, as on an anti-skid chain, so that the preliminary connections can all be made before the couplings are closed. The position of the terminal 13 also enables it to project and move through the respective link 5 without interference when the coupling is closed, as seen in Fig. 1.

In order to retain the coupling in closed position, the terminal 13 can be threaded for the engagement of a nut or retaining member 14 thereon, after the coupling is closed, and as shown, the nut 14 can have flat sides 15 permitting a portion of the nut to enter the respective link 5 while another portion bears against the link to prevent the coupling swinging open. The flat sides 15 bear against the sides of the link 5 within the same, thereby preventing the nut 14 from turning and thus avoiding the accidental detachment of the retaining nut or member 14. In this connection, importance is attached to the fact that the center of the eye of portion 11 is located at that side of a straight line (see Fig. 1) connecting the seat 10 and portion of nut 14 which bears against the corresponding link 5 opposite to the bill 8, whereby when the links 5 and 6 are under strain tending to pull them apart, such strain will tend to bring the seat 10 and center of the eye 11 into said line. This creates a constant tendency to swing the coupling slightly toward open position and will cause the nut or retaining member 14 to bear or press against the link 5 through which the bill projects, and as a result, the nut 14 is thereby held in engagement with said link and is prevented from turning. This security locks the coupling closed, but the member or nut 14 can be readily turned when the links 5 and bill 8 are pressed together by hand, so that terminal 13 projects completely through the link 5, permitting the nut to be readily applied and removed as desired. When the nut is applied and the parts released, the tension will move the nut into place against the respective link 5.

Various retaining members or means can be used on the terminal 15, another form being shown in Fig. 4. In this variation, an elongated retaining member 14' is swiveled for rotation on the terminal 13 of the bill 8 to pass through the links 5 and 6 when the member 14' is disposed longitudinally, and said member 14' can be swung to transverse position after passing through the link 5 so as to bear against said link like the nut 14 and hold the coupling closed. In this form, the member 14' remains on the terminal 13 and cannot be lost, said terminal having a head 16 or other means for holding said member thereon. The member 14' can have a stud or flattened portion 15' to enter the link 5 and prevent the member 14' from turning to releasing position when it bears against the link similar to the nut 14, both being prevented from turning for releasing the coupling.

Having thus described the invention, what I claim as new is—

1. A cam lever coupling embodying a bill having at one end a loop and a pivot portion, and a retaining member adapted to turn on the other end of the bill and arranged to bear against a member through which the bill extends to lock the parts.

2. A cam lever coupling according to claim 1, with said retaining member formed to engage the last-named member and prevent the retaining member from turning.

3. A cam lever coupling embodying a bill having at one end a loop and a pivot portion, the other end of the bill being formed to provide a hook for preliminary connection and to pass through a slotted member, and a retaining member for said hook to bear against said member due to the pulling strain of members engaging said loop and pivot portion, said retaining member being manually operable to let the hook withdraw from said slotted member.

In testimony whereof I set my hand this 25th day of September, 1918.

RUFUS A. TAWNEY.

Copies of this patent may be obtained for five cents each, by addressing the "Commissioner of Patents, Washington, D. C."